US012671111B2

(12) United States Patent
Dai et al.

(10) Patent No.:  US 12,671,111 B2
(45) Date of Patent:       Jun. 30, 2026

(54) ELECTROLYTE FOR LITHIUM ION BATTERIES

(71) Applicant: Apple Inc., Cupertino, CA (US)

(72) Inventors: Hongli Dai, Los Altos, CA (US); Libo Hu, Mountain View, CA (US); Paul M. Bayley, Santa Clara, CA (US); Zhengcheng Zhang, Naperville, IL (US); Khalil Amine, Oak Brook, IL (US); Qian Liu, Darien, IL (US); Mingfu He, Palos Park, IL (US)

(73) Assignee: Apple Inc., Cupertino, CA (US)

( * ) Notice: Subject to any disclaimer, the term of this patent is extended or adjusted under 35 U.S.C. 154(b) by 663 days.

(21) Appl. No.: 17/830,964

(22) Filed: Jun. 2, 2022

(65) Prior Publication Data

US 2022/0407112 A1     Dec. 22, 2022

Related U.S. Application Data

(60) Provisional application No. 63/211,830, filed on Jun. 17, 2021.

(51) Int. Cl.
| | |
|---|---|
| *H01M 10/0567* | (2010.01) |
| *H01M 10/0525* | (2010.01) |
| *H01M 10/0568* | (2010.01) |
| *H01M 10/0569* | (2010.01) |
| *H01M 10/0585* | (2010.01) |

(52) U.S. Cl.
CPC ... *H01M 10/0567* (2013.01); *H01M 10/0525* (2013.01); *H01M 10/0568* (2013.01); *H01M*

*10/0569* (2013.01); *H01M 10/0585* (2013.01); *H01M 2300/0042* (2013.01)

(58) Field of Classification Search
CPC ........... H01M 10/056; H01M 10/0567; H01M 10/0568; H01M 10/0569; H01M 2300/0042; H01M 10/0525
See application file for complete search history.

(56) References Cited

U.S. PATENT DOCUMENTS

| | | | |
|---|---|---|---|
| 6,033,809 | A | 3/2000 | Hamamoto et al. |
| 9,006,457 | B2 | 4/2015 | Schmidt et al. |
| 10,056,649 | B2 | 8/2018 | Li et al. |
| 10,141,572 | B2 | 11/2018 | Wu et al. |
| 10,297,823 | B2 | 5/2019 | Dai et al. |
| 10,597,307 | B2 | 3/2020 | Dai et al. |

(Continued)

FOREIGN PATENT DOCUMENTS

| | | | |
|---|---|---|---|
| CN | 101210000 | A | 7/2008 |
| CN | 103259043 | A | 8/2013 |

(Continued)

OTHER PUBLICATIONS

An, F., Zhao, H., Zhou, W. et al. S-containing and Si-containing compounds as highly effective electrolyte additives for SiOx-based anodes/NCM 811 cathodes in lithium ion cells. Sci. Rep. 9, 14108. (Year: 2019).*

(Continued)

*Primary Examiner* — Marla D McConnell
*Assistant Examiner* — Julia S Caserto
(74) *Attorney, Agent, or Firm* — BakerHostetler

(57) ABSTRACT

This disclosure relates generally to battery cells, and more particularly, electrolyte additives for use in lithium ion battery cells.

3 Claims, 9 Drawing Sheets

(56)                 References Cited

U.S. PATENT DOCUMENTS

| | | | |
|---|---|---|---|
| 10,615,413 B2 | 4/2020 | Dai et al. | |
| 11,362,331 B2 | 6/2022 | Dai et al. | |
| 11,695,108 B2 | 7/2023 | Wang et al. | |
| 11,749,799 B2 | 9/2023 | Wu et al. | |
| 11,757,096 B2 | 9/2023 | Dai et al. | |
| 12,074,321 B2 | 8/2024 | Dai et al. | |
| 12,206,100 B2 | 1/2025 | Dai et al. | |
| 2007/0099079 A1 | 5/2007 | Matsumoto et al. | |
| 2008/0305400 A1 | 12/2008 | Biensan et al. | |
| 2009/0111019 A1 | 4/2009 | Hirose et al. | |
| 2009/0136838 A1 | 5/2009 | Abe et al. | |
| 2010/0069667 A1 | 3/2010 | Hajime et al. | |
| 2011/0150736 A1 | 6/2011 | Hagiwara et al. | |
| 2011/0151317 A1 | 6/2011 | Giroud et al. | |
| 2012/0100417 A1* | 4/2012 | Ramprasad | H01M 10/0567 |
| | | | 429/188 |
| 2012/0107728 A1* | 5/2012 | Ryu | H01M 4/405 |
| | | | 429/188 |
| 2012/0288771 A1 | 11/2012 | Lim et al. | |
| 2014/0155566 A1 | 6/2014 | Ignatyen et al. | |
| 2015/0064549 A1* | 3/2015 | Pinnell | H01M 10/0567 |
| | | | 429/163 |
| 2015/0140421 A1 | 5/2015 | Ihara et al. | |
| 2017/0263928 A1 | 9/2017 | Dai et al. | |
| 2017/0288268 A1* | 10/2017 | Kim | H01M 10/0569 |
| 2020/0044242 A1 | 2/2020 | Wang et al. | |
| 2020/0044285 A1 | 2/2020 | Su et al. | |
| 2020/0058933 A1 | 2/2020 | Wu et al. | |
| 2021/0057739 A1 | 2/2021 | Dai et al. | |
| 2021/0057740 A1 | 2/2021 | Dai et al. | |
| 2021/0057745 A1 | 2/2021 | Dai et al. | |
| 2021/0194059 A1 | 6/2021 | Zhang et al. | |
| 2023/0094322 A1 | 3/2023 | Peng et al. | |
| 2023/0246185 A1 | 8/2023 | Zhang et al. | |
| 2025/0054993 A1 | 2/2025 | Zhao et al. | |

FOREIGN PATENT DOCUMENTS

| | | | |
|---|---|---|---|
| CN | 103618111 A | 3/2014 | |
| CN | 110718715 A | 1/2020 | |
| CN | 111816922 A | 10/2020 | |
| CN | 111969250 A | 11/2020 | |
| CN | 112652817 A | 4/2021 | |
| JP | 2006-210022 A | 8/2006 | |
| JP | 3856583 B2 | 12/2006 | |
| JP | 2015-118852 A | 6/2015 | |
| JP | 2017-004638 A | 1/2017 | |
| KR | 2023-0044353 A | 4/2023 | |
| WO | WO 2017/160852 A1 | 9/2017 | |
| WO | WO 2018/057584 A1 | 3/2018 | |
| WO | WO 2022/188037 A1 | 9/2022 | |
| WO | WO 2023/134262 A1 | 7/2023 | |

OTHER PUBLICATIONS

Arumugam, R.S. et al. Special Synergy between Electrolyte Additives and Positive Electrode Surface Coating to Enhance the Performance of Li[Ni0.6Mn0.2Co0.2]O2/Graphite Cells. J. Electrochem. Soc. 163, 13, A2531-A2538. (Year: 2016).*

Zhang et al.; "Investigation of the synergetic effects of LiBF4 and LiODFB as wide-temperature electrolyte salts in lithium-ion batteries"; Ionics; vol. 24; 2018; p. 2995-3004.

Kowsari and Ebrahimi, Phys. Chem. Chem. Phys., 2018,20, 13379-13393. [Title and Abstract only].

Nokemann et al.; "Cobalt(II) Complexes of Nitrile-Functionalized Ionic Liquids"; Chem. Eur. J.; vol. 16, 2010; p. 1849-1858.

Oldiges et al.; "Understanding transport mechanisms in ionic liquid/carbonate solvent electrolyte blends"; Royal Society of Chemistry; vol. 20; 2018; p. 16579-16591.

Cong et al.; "Design and synthesis of functional ionic liquids based on pyrrolidinium cations bearing alkyl nitrile moieties": Royal Society of Chemistry; vol. 2; 2014; p. 20147-20153.

Qi et al.; "High-Voltage Resistant Ionic Liquids for Lithium-Ion Batteries"; ACS Applied Materials & Interfaces; vol. 12; 2020; p. 591-600.

Zhao et al.; "Dual-functionalised ionic liquids: synthesis and characterization of imidazolium salts with a nitrile-functionalised anion"; The Royal Society Chemistry; 2004; p. 2500-2501.

Xia et al.; "Improving the long-term cycling performance of lithium-ion batteries at elevated temperature with electrolyte additives"; Journal of Power Sources; vol. 287; 2015; p. 377-385.

Wang et al.; "A Systematic Study of Electrolyte Additives in Li[Ni1/3Mn1/3Co1/3]O2 (NMC)/Graphite Pouch Cells"; Journal of the Electrochemical Society; vol. 161; 2014; p. A1818-A1827.

Ma et al.; "Improving the High Voltage Cycling of Li[Ni0.42Mn0.42Co0.16]O2 (NMC442)/Graphite Pouch Cells Using Electrolyte Additives"; Journal of The Electrochemical Society; vol. 161; 2014; p. A2250-A2254.

Zuo et al.; "Effect of tris(trimethylsilyl)borate on the high voltage capacity retention of LiNi0.5CO0.2Mn0.3O2/graphite cells"; Journal of Power Sources; vol. 229; 2013; p. 308-312.

* cited by examiner

| Salt/M | Solvent wt% | | | | Additives wt% | | |
|---|---|---|---|---|---|---|---|
| | EC | PC | PP | EP | PS | FEC | SN |
| LiPF6 | 20 | 10 | 45 | 25 | 4 | 7 | 3 |
| 1.2 | | | | | | | |

*Fig. 3B*

| Electrolyte Fluid Form. Number | Salt/M | Solvent wt% | | | | Additives wt% | | | | | | | |
|---|---|---|---|---|---|---|---|---|---|---|---|---|---|
| | LiPF6 | EC | PC | PP | EP | LiDFOB | VEC | PES | PS | FEC | SN | HTCN | MMDS |
| 2 | 1.2 | 20 | 10 | 45 | 25 | 0.5 | 0.5 | 0 | 4 | 7 | 2 | 3 | 0 |
| 3 | 1.2 | 20 | 10 | 45 | 25 | 1 | 0 | 1 | 3 | 7 | 2 | 3 | 0.5 |
| 4 | 1.2 | 20 | 10 | 45 | 25 | 1 | 0 | 3 | 1 | 7 | 2 | 3 | 0 |
| 5 | 1.2 | 20 | 10 | 45 | 25 | 0.7 | 0 | 2.5 | 1.5 | 7 | 2 | 3 | 0.5 |
| 6 | 1.2 | 20 | 10 | 45 | 25 | 0.7 | 0 | 1.5 | 2.5 | 7 | 2 | 3 | 0.5 |

*Fig. 4B*

| Electrolyte Fluid Form. Number | Salt/M | Solvent wt% | | | | Additives wt% | | | | | | | |
|---|---|---|---|---|---|---|---|---|---|---|---|---|---|
| | LiPF6 | EC | PC | PP | EP | LiDFOB | VEC | PES | PS | FEC | SN | HTCN | MMDS |
| 2 | 1.2 | 20 | 10 | 45 | 25 | 0.5 | 0.5 | 0 | 4 | 7 | 2 | 3 | 0 |
| 3 | 1.2 | 20 | 10 | 45 | 25 | 1 | 0 | 1 | 3 | 7 | 2 | 3 | 0.5 |
| 4 | 1.2 | 20 | 10 | 45 | 25 | 1 | 0 | 3 | 1 | 7 | 2 | 3 | 0 |

*Fig. 5B*

ELECTROLYTE FOR LITHIUM ION BATTERIES

CROSS-REFERENCE TO RELATED PATENT APPLICATION

This patent application claims the benefit under 35 U.S.C. § 119(e) of U.S. Patent Application No. 63/211,830, entitled "Electrolyte for Lithium Ion Batteries", filed on Jun. 17, 2021, which is incorporated herein by reference in its entirety.

U.S. GOVERNMENT LICENSE RIGHTS

This invention was made with U.S. government support under WFO Proposal No. 85C85. This invention was made under a CRADA 1500801 between Apple Inc. and Argonne National Laboratory operated for the United States Department of Energy. The U.S. government has certain rights in the invention.

FIELD

This disclosure relates generally to battery cells, and more particularly, electrolyte additives for use in lithium ion battery cells.

BACKGROUND

Li-ion batteries are widely used as the power sources in consumer electronics. Consumer electronics need Li-ion batteries which can deliver higher volumetric energy densities and sustain more discharge-charge cycles. A Li-ion battery typically works at a voltage up to 4.45 V (full cell voltage).

A battery life cycle can deteriorate due to instability of cathode structure and electrolyte degradation. The cathode material stability can be improved by the modification of $LiCoO_2$ such as doping and surface coating. Limited progress has been made in developing electrolytes that can enable both high volumetric energy densities and long battery cycling life. Most existing electrolytes suffer from poor ability to form stable cathode-electrolyte (CEI) and/or solid-electrolyte interphases (SEI), leading to fast interfacial impedance growth and capacity decay.

SUMMARY

In a first aspect, the disclosure is directed to an electrolyte fluid including at least two of lithium difluoro(oxalato) borate (LiDFOB), prop-1-ene-1,3-sultone (PES), and methylene methanedisulfonate (MMDS). In some variations, the electrolyte fluid includes LiDFOB and PES. In some variations, the electrolyte fluid includes LiDFOB and MMDS. In some variations, the electrolyte fluid includes LiDFOB, PES, and MMDS.

In a second aspect, the electrolyte fluid can include an electrolyte salt selected from $LiPF_6$, $LiBF_4$, $LiClO_4$, $LiSO_3CF_3$, $LiN(SO_2F)_2$, $LiN(SO_2CF_3)_2$, $LiBC_4O_8$, $Li[PF_3(C_2CF_5)_3]$, $LiC(SO_2CF_3)_3$, and a combination thereof. In some variations, the salt is $LiPF_6$.

In a third aspect, the electrolyte fluid can include a solvent selected from propylene carbonate (PC), ethylene carbonate (EC), dimethyl carbonate (DMC), diethyl carbonate (DEC), ethyl-methyl carbonate (EMC), ethyl propionate (EP), butyl butyrate (BB), methyl acetate (MA), methyl butyrate (MB), methyl propionate (MP), propylene carbonate (PC), ethyl acetate (EA), propyl propionate (PP), butyl propionate (BP), propyl acetate (PA), butyl acetate (BA), and a combination thereof. In some variations, the solvent is selected from PC, EC, PP, EP, and a combination thereof. In some variations, the solvent comprises PC, EC, PP, and EP.

In a fourth aspect, the electrolyte fluid includes an additive selected from vinyl ethylene carbonate (VEC), propane sultone (PS), fluoroethylene carbonate (FEC), succinonitrile (SN), vinyl carbonate (VC), adiponitrile (ADN), ethyleneglycol bis(2-cyanoethyl)ether (EGPN), and/or 1,3,6-hexanetricarbonitrile (HTCN), and a combination thereof. In some variations, the additive is selected from PS, FEC, SN, HTCN, and a combination thereof. In some variations, the additive includes PS, FEC, SN, and HTCN.

In a fifth aspect, the disclosure is directed to a battery cell. The battery cell can include a cathode having a cathode active material disposed on a cathode current collector, and an anode having an anode active material disposed on an anode current collector. The anode is oriented towards the cathode such that the anode active material faces the cathode active material. A separator is disposed between the cathode active material and the anode active material. An electrolyte fluid as described herein is disposed between the cathode and anode.

BRIEF DESCRIPTION OF THE DRAWINGS

The disclosure will be readily understood by the following detailed description in conjunction with the accompanying drawings, wherein like reference numerals designate like structural elements, and in which:

FIG. 3B depicts the formulation of the control electrolyte fluid in FIG. 3A, in accordance with illustrative embodiments;

FIG. 4B depicts the formulation of the electrolyte fluids in FIG. 4A, in accordance with illustrative embodiments;

FIG. 5B depicts the formulation of the electrolyte fluids in FIG. 5A, in accordance with illustrative embodiments.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
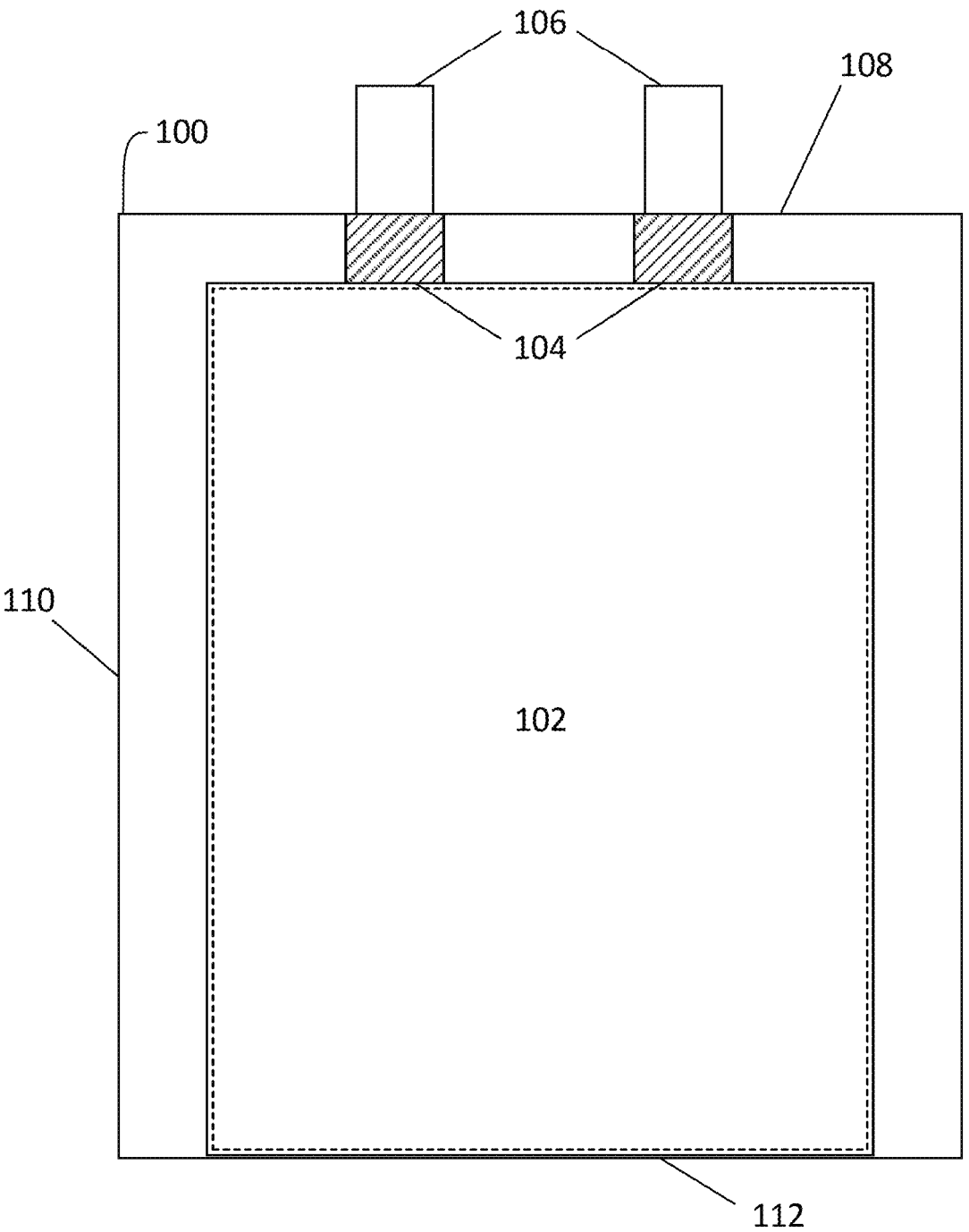
FIG. 1 is a top-down view of a battery cell, in accordance with illustrative embodiments.

FIG. 1 presents a top-down view of a battery cell 100 in accordance with an illustrative embodiment. The battery cell 100 may correspond to a lithium-ion or lithium-polymer battery cell that is used to power a device used in a consumer, medical, aerospace, defense, and/or transportation application. The battery cell 100 includes a stack 102 containing a number of layers that include a cathode with a cathode active coating, a separator, and an anode with an anode active coating. More specifically, the stack 102 may include one strip of cathode active material (e.g., aluminum foil coated with a lithium compound) and one strip of anode active material (e.g., copper foil coated with carbon). The stack 102 also includes one strip of separator material (e.g., a microporous polymer membrane or non-woven fabric mat) disposed between the one strip of cathode active material and the one strip of anode active material. The cathode, anode, and separator layers may be left flat in a planar configuration or may be wrapped into a wound configuration (e.g., a "jelly roll"). An electrolyte solution is disposed between each cathode and anode.

During assembly of the battery cell 100, the stack 102 can be enclosed in a pouch or container. The stack 102 may be in a planar or wound configuration, although other configurations are possible. In some variations, the pouch such as a pouch formed by folding a flexible sheet along a fold line 112. In some instances, the flexible sheet is made of aluminum with a polymer film, such as polypropylene. After the flexible sheet is folded, the flexible sheet can be sealed, for example, by applying heat along a side seal 110 and along a terrace seal 108. The flexible pouch may be less than or equal to 120 microns thick to improve the packaging efficiency of the battery cell 100, the density of battery cell 100, or both.

The stack 102 can also include a set of conductive tabs 106 coupled to the cathode and the anode. The conductive tabs 106 may extend through seals in the pouch (for example, formed using sealing tape 104) to provide terminals for the battery cell 100. The conductive tabs 106 may then be used to electrically couple the battery cell 100 with one or more other battery cells to form a battery pack. For example, the battery pack may be formed by coupling the battery cells in a series, parallel, or a series-and-parallel configuration. Such coupled cells may be enclosed in a hard case to complete the battery pack, or may be embedded within an enclosure of a portable electronic device, such as a laptop computer, tablet computer, mobile phone, personal digital assistant (PDA), digital camera, and/or portable media player.

Figure 2:
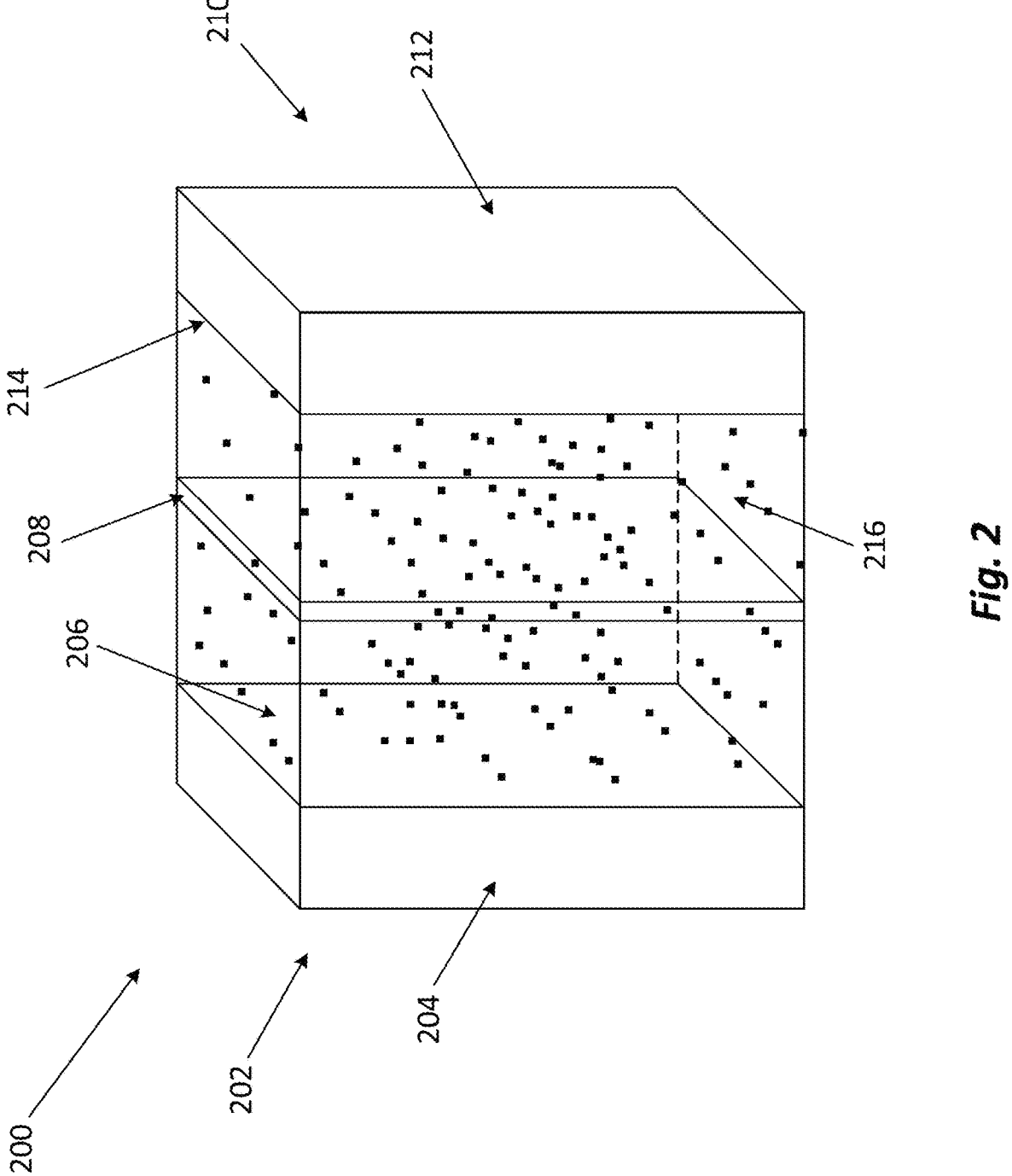
FIG. 2 is a perspective view of a battery cell, in accordance with illustrative embodiments.

FIG. 2 presents a perspective view of battery cell 200 (e.g., the battery cell 100 of FIG. 1) in accordance with the disclosed illustrative embodiments. The battery includes a cathode 202 that includes current collector 204 and cathode active material 206 and anode 210 including anode current collector 212 and anode active material 214. Separator 208 is disposed between cathode 202 and anode 210. Electrolyte fluid 216 is disposed between cathode 202 and anode 210, and is in contact with separator 208. To create the battery cell, cathode 202, separator 208, and anode 210 may be stacked in a planar configuration, or stacked and then wrapped into a wound configuration. Electrolyte fluid 216 can then be added. Before assembly of the battery cell, the set of layers may correspond to a cell stack.

The cathode current collector, cathode active material, anode current collector, anode active material, and separator may be any material known in the art. In some variations, the cathode current collector may be an aluminum foil, the anode current collector may be a copper foil. The cathode active material can be any material described in, for example, Ser. No. 14/206,654, 15/458,604, 15/458,612, 15/709,961, 15/710,540, 15/804,186, 16/531,883, 16/529, 545, 16/999,307, 16/999,328, 16/999,265, each of which is incorporated herein by reference in its entirety.

The separator may include a microporous polymer membrane or non-woven fabric mat. Non-limiting examples of the microporous polymer membrane or non-woven fabric mat include microporous polymer membranes or non-woven fabric mats of polyethylene (PE), polypropylene (PP), polyamide (PA), polytetrafluoroethylene (PTFE), polyvinyl chloride (PVC), polyester, and polyvinylidene difluoride (Pad). However, other microporous polymer membranes or non-woven fabric mats are possible (e.g., gel polymer electrolytes).

In general, separators represent structures in a battery, such as interposed layers, that prevent physical contact of cathodes and anodes while allowing ions to transport therebetween. Separators are formed of materials having pores that provide channels for ion transport, which may include absorbing an electrolyte fluid that contains the ions. Materials for separators may be selected according to chemical stability, porosity, pore size, permeability, wettability, mechanical strength, dimensional stability, softening temperature, and thermal shrinkage. These parameters can influence battery performance and safety during operation.

In general, electrolyte fluid can act a conductive pathway for the movement of cations passing from the negative to the positive electrodes during discharge. The electrolyte fluid includes an electrolyte salt, electrolyte solvent, and one or more electrolyte additives.

The electrolyte fluid includes an electrolyte solvent. The electrolyte solvent may be any type of electrolyte solvent suitable for battery cells. Non-limiting examples of the electrolyte solvents include propylene carbonate (PC), ethylene carbonate (EC), dimethyl carbonate (DMC), diethyl carbonate (DEC), ethyl-methyl carbonate (EMC), ethyl propionate (EP), butyl butyrate (BB), methyl acetate (MA), methyl butyrate (MB), methyl propionate (MP), propylene carbonate (PC), ethyl acetate (EA), propyl propionate (PP), butyl propionate (BP), propyl acetate (PA), and butyl acetate (BA), or combinations thereof.

The electrolyte fluid also has one or more electrolyte salts dissolved therein. The salt may be any type of salt suitable for battery cells. For example, and without limitation, salts for a lithium-ion battery cell include $LiPF_6$, $LiBF_4$, $LiClO_4$, $LiSO_3CF_3$, $LiN(SO_2F)_2$, $LiN(SO_2CF_3)_2$, $LiBC_4O_8$, $Li[PF_3(C_2CF_5)_3]$, $LiC(SO_2CF_3)_3$, and any combinations thereof. Other salts are possible, including combinations of salts.

In some variations, the salt is at least 0.1 M in the total electrolyte fluid. In some variations, the salt is at least 0.2 M in the total electrolyte fluid. In some variations, the salt is at least 0.3 M in the total electrolyte fluid. In some variations, the salt is at least 0.4 M in the total electrolyte fluid. In some variations, the salt is at least 0.5 M in the total electrolyte fluid. In some variations, the salt is at least 0.6 M in the total electrolyte fluid. In some variations, the salt is at least 0.7 M in the total electrolyte fluid. In some variations, the salt is at least 0.8 M in the total electrolyte fluid. In some variations, the salt is at least 0.9 M in the total electrolyte fluid. In some variations, the salt is at least 1.0 M in the total electrolyte fluid. In some variations, the salt is at least 1.3 M in the total electrolyte fluid. In some variations, the salt is at least 1.6 M in the total electrolyte fluid. In some variations, the salt is at least 1.9 M in the total electrolyte fluid.

In some variations, the salt is less than or equal to 2.0 M in the electrolyte fluid. In some variations, the salt is less than or equal to 1.9 M in the electrolyte fluid. In some variations, the salt is less than or equal to 1.6 M in the electrolyte fluid. In some variations, the salt is less than or equal to 1.3 M in the electrolyte fluid. In some variations, the salt is less than or equal to 1.1 M in the electrolyte fluid. In some variations, the salt is less than or equal to 1.0 M in the electrolyte fluid. In some variations, the salt is less than or equal to 0.9 M in the electrolyte fluid. In some variations, the salt is less than or equal to 0.8 M in the electrolyte fluid. In some variations, the salt is less than or equal to 0.7 M in the electrolyte fluid. In some variations, the salt is less than or equal to 0.6 M in the electrolyte fluid. In some variations, the salt is less than or equal to 0.5 M in the electrolyte fluid. In some variations, the salt is less than or equal to 0.4 M in the electrolyte fluid. In some variations, the salt is less than or equal to 0.3 M in the electrolyte fluid. In some variations, the salt is less than or equal to 0.2 M in the electrolyte fluid.

In some variations, the electrolyte fluid can include one or more additives. In various aspects, the additives can include lithium difluoro(oxalato)borate (LiDFOB), pro-1-ene-1, 3-sultone (PES), and methylene methanedisulfonate (MMDS). The disclosure is directed to electrolyte solutions containing at least two additives selected from LiDFOB, PES, and MMDS. In some variations, the additives are LiDFOB and PES. In some variations, the additives are LiDFOB and MMDS. In some variations, the additives are PES and MMDS. The combination of the LiDFOB, PES, and MMDS additives in combination provides substantial improvements over what would be expected of the additives separately, or in different combinations.

The amount of each a LiDFOB, PES, and MMDS can be at least, less than or equal to different amounts in different combinations.

In some variations, LiDFOB is at least 0.1 wt % of the total electrolyte fluid. In some variations, LiDFOB is at least 0.2 wt % of the total electrolyte fluid. In some variations, LiDFOB is at least 0.3 wt % of the total electrolyte fluid. In some variations, LiDFOB is at least 0.4 wt % of the total electrolyte fluid. In some variations, LiDFOB is at least 0.5 wt % of the total electrolyte fluid. In some variations, LiDFOB is at least 0.6 wt % of the total electrolyte fluid. In some variations, LiDFOB is at least 0.7 wt % of the total electrolyte fluid. In some variations, LiDFOB is at least 0.8 wt % of the total electrolyte fluid. In some variations, LiDFOB is at least 0.9 wt % of the total electrolyte fluid. In some variations, LiDFOB is at least 1.0 wt % of the total electrolyte fluid. In some variations, LiDFOB is at least 1.3 wt % of the total electrolyte fluid. In some variations, LiDFOB is at least 1.6 wt % of the total electrolyte fluid. In some variations, LiDFOB is at least 1.9 wt % of the total electrolyte fluid.

In some variations, LiDFOB is less than or equal to 2.0 wt % of the total electrolyte fluid. In some variations, LiDFOB is less than or equal to 1.9 wt % of the total electrolyte fluid. In some variations, LiDFOB is less than or equal to 1.3 wt % of the total electrolyte fluid. In some variations, LiDFOB is less than or equal to 1.3 wt % of the total electrolyte fluid. In some variations, LiDFOB is less than or equal to 1.1 wt % of the total electrolyte fluid. In some variations, LiDFOB is less than or equal to 1.0 wt % of the total electrolyte fluid. In some variations, LiDFOB is less than or equal to 0.9 wt % of the total electrolyte fluid. In some variations, LiDFOB is less than or equal to 0.8 wt % of the total electrolyte fluid. In some variations, LiDFOB is less than or equal to 0.7 wt % of the total electrolyte fluid. In some variations, LiDFOB is less than or equal to 0.6 wt % of the total electrolyte fluid. In some variations, LiDFOB is less than or equal to 0.5 wt % of the total electrolyte fluid. In some variations, LiDFOB is less than or equal to 0.4 wt % of the total electrolyte fluid. In some variations, LiDFOB is less than or equal to 0.3 wt % of the total electrolyte fluid. In some variations, LiDFOB is less than or equal to 0.2 wt % of the total electrolyte fluid.

In some variations, the amount of PES is at least 0.5 wt % of the total electrolyte fluid. In some variations, the amount of PES is at least 0.6 wt % of the total electrolyte fluid. In some variations, the amount of PES is at least 0.9 wt % of the total electrolyte fluid. In some variations, the amount of PES is at least 1.3 wt % of the total electrolyte fluid. In some variations, the amount of PES is at least 1.6 wt % of the total electrolyte fluid. In some variations, the amount of PES is at least 1.9 wt % of the total electrolyte fluid. In some variations, the amount of PES is at least 2.2 wt % of the total electrolyte fluid. In some variations, the amount of PES is at least 2.5 wt % of the total electrolyte fluid. In some variations, the amount of PES is at least 2.8 wt % of the total electrolyte fluid. In some variations, the amount of PES is at least 3.0 wt % of the total electrolyte fluid.

In some variations, the amount of PES is less than or equal to 3.5 wt % of the total electrolyte fluid. In some variations, the amount of PES is less than or equal to 3.0 wt % of the total electrolyte fluid. In some variations, the amount of PES is less than or equal to 2.8 wt % of the total electrolyte fluid. In some variations, the amount of PES is less than or equal to 2.5 wt % of the total electrolyte fluid. In some variations, the amount of PES is less than or equal to 2.2 wt % of the total electrolyte fluid. In some variations, the amount of PES is less than or equal to 1.9 wt % of the total electrolyte fluid. In some variations, the amount of PES is less than or equal to 1.6 wt % of the total electrolyte fluid. In some variations, the amount of PES is less than or equal to 1.3 wt % of the total electrolyte fluid. In some variations, the amount of PES is less than or equal to 1.1 wt % of the total electrolyte fluid. In some variations, the amount of PES is less than or equal to 0.9 wt % of the total electrolyte fluid. In some variations, the amount of PES is less than or equal to 0.6 wt % of the total electrolyte fluid.

In some variations, the amount of MMDS is at least 0.1 wt % of the total electrolyte fluid. In some variations, the amount of MMDS is at least 0.2 wt % of the total electrolyte fluid. In some variations, the amount of MMDS is at least 0.3 wt % of the total electrolyte fluid. In some variations, the amount of MMDS is at least 0.4 wt % of the total electrolyte fluid. In some variations, the amount of MMDS is at least 0.5 wt % of the total electrolyte fluid. In some variations, the amount of MMDS is at least 0.6 wt % of the total electrolyte fluid. In some variations, the amount of MMDS is at least 0.7 wt % of the total electrolyte fluid. In some variations, the amount of MMDS is at least 0.8 wt % of the total electrolyte fluid. In some variations, the amount of MMDS is at least 0.9 wt % of the total electrolyte fluid. In some variations, the amount of MMDS is at least 1.0 wt % of the total electrolyte fluid. In some variations, the amount of MMDS is at least 1.1 wt % of the total electrolyte fluid. In some variations, the amount of MMDS is at least 1.2 wt % of the total electrolyte fluid. In some variations, the amount of MMDS is at least 1.3 wt % of the total electrolyte fluid. In some variations, the amount of MMDS is at least 1.4 wt % of the total electrolyte fluid.

In some variations, the amount of MMDS is less than or equal to 1.5 wt % of the total electrolyte fluid. In some variations, the amount of MMDS is less than or equal to 1.4 wt % of the total electrolyte fluid. In some variations, the amount of MMDS is less than or equal to 1.3 wt % of the total electrolyte fluid. In some variations, the amount of MMDS is less than or equal to 1.2 wt % of the total electrolyte fluid. In some variations, the amount of MMDS is less than or equal to 1.1 wt % of the total electrolyte fluid. In some variations, the amount of MMDS is less than or equal to 1.0 wt % of the total electrolyte fluid. In some variations, the amount of MMDS is less than or equal to 0.9 wt % of the total electrolyte fluid. In some variations, the amount of MMDS is less than or equal to 0.8 wt % of the total electrolyte fluid. In some variations, the amount of MMDS is less than or equal to 0.7 wt % of the total electrolyte fluid. In some variations, the amount of MMDS is less than or equal to 0.6 wt % of the total electrolyte fluid. In some variations, the amount of MMDS is less than or equal to 0.5 wt % of the total electrolyte fluid. In some variations, the amount of MMDS is less than or equal to 0.4 wt % of the total electrolyte fluid. In some variations, the amount of MMDS is less than or equal to 0.3 wt % of the total electrolyte fluid. In some variations, the amount of MMDS is less than or equal to 0.2 wt % of the total electrolyte fluid.

In further variations, the electrolyte fluid can include additional additives. The additives can include one or more of vinyl ethylene carbonate (VEC), propane sultone (PS), fluoroethylene carbonate (FEC), succinonitrile (SN), vinyl carbonate (VC), adiponitrile (ADN), ethyleneglycol bis(2-cyanoethyl)ether (EGPN), and/or 1,3,6-hexanetricarbonitrile (HTCN), in any combination.

In some variations, the amount of VEC is at least 0.1 wt % of the total electrolyte fluid. In some variations, the amount of VEC is at least 0.2 wt % of the total electrolyte fluid. In some variations, the amount of VEC is at least 0.3 wt % of the total electrolyte fluid. In some variations, the amount of VEC is at least 0.4 wt % of the total electrolyte fluid. In some variations, the amount of VEC is at least 0.5 wt % of the total electrolyte fluid. In some variations, the amount of VEC is at least 0.6 wt % of the total electrolyte fluid. In some variations, the amount of VEC is at least 0.7 wt % of the total electrolyte fluid. In some variations, the amount of VEC is at least 0.8 wt % of the total electrolyte fluid. In some variations, the amount of VEC is at least 0.9 wt % of the total electrolyte fluid.

In some variations, the amount of VEC is less than or equal to 0.9 wt % of the total electrolyte fluid. In some variations, the amount of VEC is less than or equal to 0.8 wt % of the total electrolyte fluid. In some variations, the amount of VEC is less than or equal to 0.7 wt % of the total electrolyte fluid. In some variations, the amount of VEC is less than or equal to 0.6 wt % of the total electrolyte fluid. In some variations, the amount of VEC is less than or equal to 0.5 wt % of the total electrolyte fluid. In some variations, the amount of VEC is less than or equal to 0.4 wt % of the total electrolyte fluid. In some variations, the amount of VEC is less than or equal to 0.3 wt % of the total electrolyte fluid. In some variations, the amount of VEC is less than or equal to 0.2 wt % of the total electrolyte fluid.

In some variations, the amount of FEC is at least 2 wt % of the total electrolyte fluid. In some variations, the amount of FEC is at least 4 wt % of the total electrolyte fluid. In some variations, the amount of FEC is at least 6 wt % of the total electrolyte fluid. In some variations, the amount of FEC is at least 8 wt % of the total electrolyte fluid. In some variations, the amount of FEC is less than or equal to 10 wt % of the total electrolyte fluid. In some variations, the amount of FEC is less than or equal to 8 wt % of the total electrolyte fluid. In some variations, the amount of FEC is less than or equal to 6 wt % of the total electrolyte fluid. In some variations, the amount of FEC is less than or equal to 4 wt % of the total electrolyte fluid.

In some variations, the amount of PS is at least 0.5 wt % of the total electrolyte fluid. In some variations, the amount of PS is at least 1.0 wt % of the total electrolyte fluid. In some variations, the amount of PS is at least 1.5 wt % of the total electrolyte fluid. In some variations, the amount of PS is at least 2.0 wt % of the total electrolyte fluid. In some variations, the amount of PS is at least 2.5 wt % of the total electrolyte fluid. In some variations, the amount of PS is at least 3.0 wt % of the total electrolyte fluid. In some variations, the amount of PS is at least 3.5 wt % of the total electrolyte fluid. In some variations, the amount of PS is at least 4.0 wt % of the total electrolyte fluid. In some variations, the amount of PS is at least 4.5 wt % of the total electrolyte fluid. In some variations, the amount of PS is at least 5.0 wt % of the total electrolyte fluid.

In some variations, the amount of PS is less than or equal to 6.0 wt % of the total electrolyte fluid. In some variations, the amount of PS is less than or equal to 5.5 wt % of the total electrolyte fluid. In some variations, the amount of PS is less than or equal to 5.0 wt % of the total electrolyte fluid. In some variations, the amount of PS is less than or equal to 4.5 wt % of the total electrolyte fluid. In some variations, the amount of PS is less than or equal to 4.0 wt % of the total electrolyte fluid. In some variations, the amount of PS is less than or equal to 3.5 wt % of the total electrolyte fluid. In some variations, the amount of PS is less than or equal to 3.0 wt % of the total electrolyte fluid. In some variations, the amount of PS is less than or equal to 2.5 wt % of the total electrolyte fluid. In some variations, the amount of PS is less than or equal to 2.0 wt % of the total electrolyte fluid. In some variations, the amount of PS is less than or equal to 1.5 wt % of the total electrolyte fluid. In some variations, the amount of PS is less than or equal to 1.0 wt % of the total electrolyte fluid.

In some variations, the amount of SN is at least 0.5 wt % of the total electrolyte fluid. In some variations, the amount of SN is at least 1.0 wt % of the total electrolyte fluid. In some variations, the amount of SN is at least 1.5 wt % of the total electrolyte fluid. In some variations, the amount of SN is at least 2.0 wt % of the total electrolyte fluid. In some variations, the amount of SN is at least 2.5 wt % of the total electrolyte fluid. In some variations, the amount of SN is at least 3.0 wt % of the total electrolyte fluid. In some variations, the amount of SN is at least 3.5 wt % of the total electrolyte fluid. In some variations, the amount of SN is at least 4.0 wt % of the total electrolyte fluid. In some variations, the amount of SN is at least 4.5 wt % of the total electrolyte fluid. In some variations, the amount of SN is at least 5.0 wt % of the total electrolyte fluid.

In some variations, the amount of SN is less than or equal to 6.0 wt % of the total electrolyte fluid. In some variations, the amount of SN is less than or equal to 5.5 wt % of the total electrolyte fluid. In some variations, the amount of SN is less than or equal to 5.0 wt % of the total electrolyte fluid. In some variations, the amount of SN is less than or equal to 4.5 wt % of the total electrolyte fluid. In some variations, the amount of SN is less than or equal to 4.0 wt % of the total electrolyte fluid. In some variations, the amount of SN is less than or equal to 3.5 wt % of the total electrolyte fluid. In some variations, the amount of SN is less than or equal to 3.0 wt % of the total electrolyte fluid. In some variations, the amount of SN is less than or equal to 2.5 wt % of the total electrolyte fluid. In some variations, the amount of SN is less than or equal to 2.0 wt % of the total electrolyte fluid. In some variations, the amount of SN is less than or equal to 1.5 wt % of the total electrolyte fluid. In some variations, the amount of SN is less than or equal to 1.0 wt % of the total electrolyte fluid.

In some variations, the amount of HTCN is at least 0.5 wt % of the total electrolyte fluid. In some variations, the amount of HTCN is at least 1.0 wt % of the total electrolyte fluid. In some variations, the amount of HTCN is at least 1.5 wt % of the total electrolyte fluid. In some variations, the amount of HTCN is at least 2.0 wt % of the total electrolyte fluid. In some variations, the amount of HTCN is at least 2.5 wt % of the total electrolyte fluid. In some variations, the amount of HTCN is at least 3.0 wt % of the total electrolyte fluid. In some variations, the amount of HTCN is at least 3.5 wt % of the total electrolyte fluid. In some variations, the amount of HTCN is at least 4.0 wt % of the total electrolyte fluid. In some variations, the amount of HTCN is at least 4.5 wt % of the total electrolyte fluid. In some variations, the amount of HTCN is at least 5.0 wt % of the total electrolyte fluid.

In some variations, the amount of HTCN is less than or equal to 6.0 wt % of the total electrolyte fluid. In some variations, the amount of HTCN is less than or equal to 5.5 wt % of the total electrolyte fluid. In some variations, the amount of HTCN is less than or equal to 5.0 wt % of the total electrolyte fluid. In some variations, the amount of HTCN is less than or equal to 4.5 wt % of the total electrolyte fluid. In some variations, the amount of HTCN is less than or equal to 4.0 wt % of the total electrolyte fluid. In some variations, the amount of HTCN is less than or equal to 3.5 wt % of the total electrolyte fluid. In some variations, the amount of HTCN is less than or equal to 3.0 wt % of the total electrolyte fluid. In some variations, the amount of HTCN is less than or equal to 2.5 wt % of the total electrolyte fluid. In some variations, the amount of HTCN is less than or equal to 2.0 wt % of the total electrolyte fluid. In some variations, the amount of HTCN is less than or equal to 1.5 wt % of the total electrolyte fluid. In some variations, the amount of HTCN is less than or equal to 1.0 wt % of the total electrolyte fluid.

cathode and graphite anode with control electrolyte 300 and baseline electrolyte plus separate additives LiDFOB (302), MMDS (304), and PES (306). The discharge capacity of each separate additive LiDFOB, MMDS, and PES each individually showed improved discharge capacities over the baseline electrolyte.

FIG. 3B shows the composition of the control electrolyte fluid.

Example 2

Figure 4A:
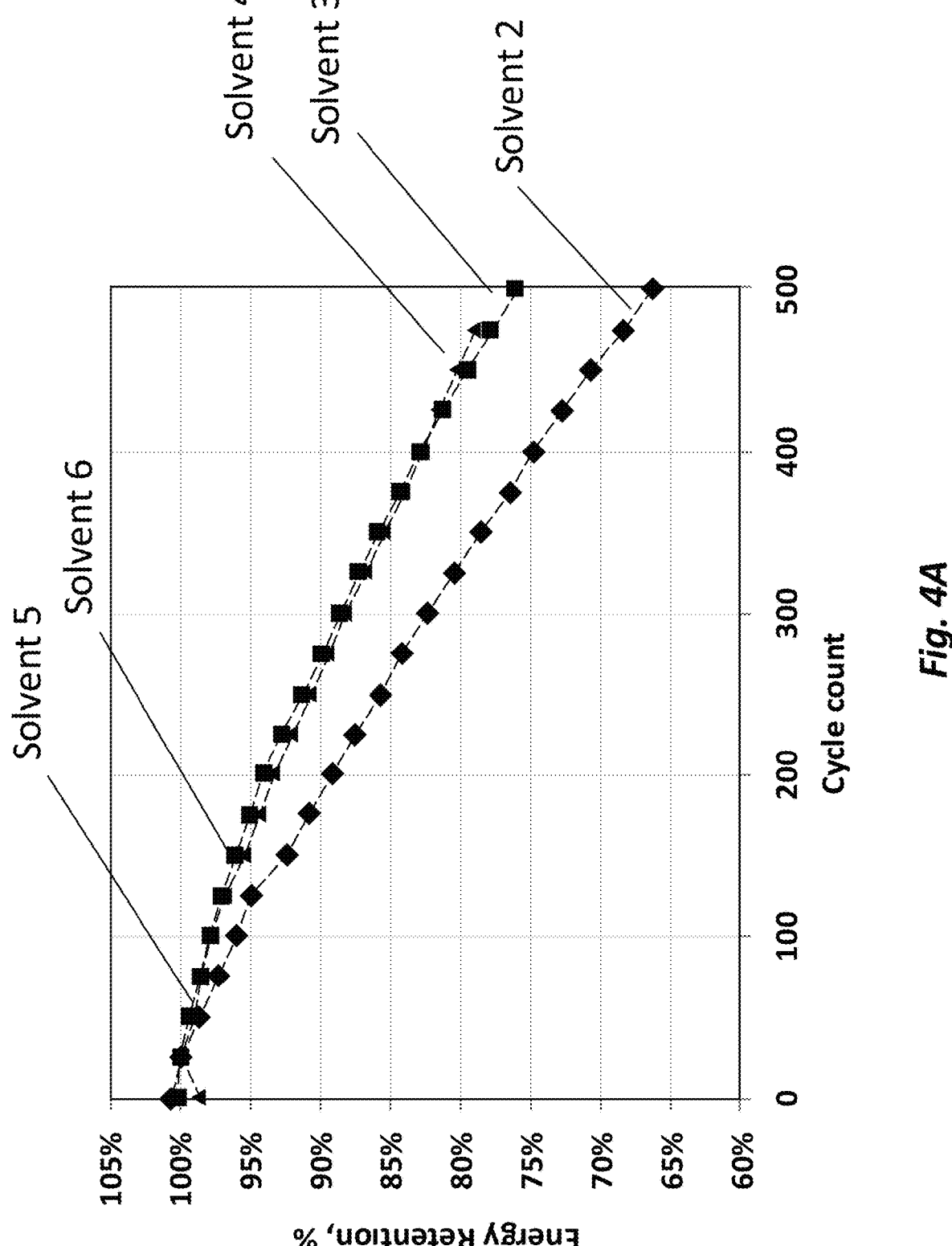
FIG. 4A discharge capacity as a function of cycle count for Li-ion batteries having different combinations of electrolyte fluid additives, in accordance with illustrative embodiments.

FIG. 4A presents a plot of the energy retention as a function of cycle count for Li-ion batteries comprising a $LiCoO_2$ cathode and graphite anode with new formulated electrolytes (0.2C cycling current at 45° C.; 4.50 V-upper cutoff voltage). The electrolyte solution with lower energy retention over cycle time includes only LiDFOB additive, but not PES or MMDS. Electrolyte solutions that included LiDFOB and PES, or LiDFOB, PES, and MMDS maintained roughly equivalent energy retention.

FIG. 4B shows the composition of the control electrolyte fluids.

Example 3

Figure 5A:
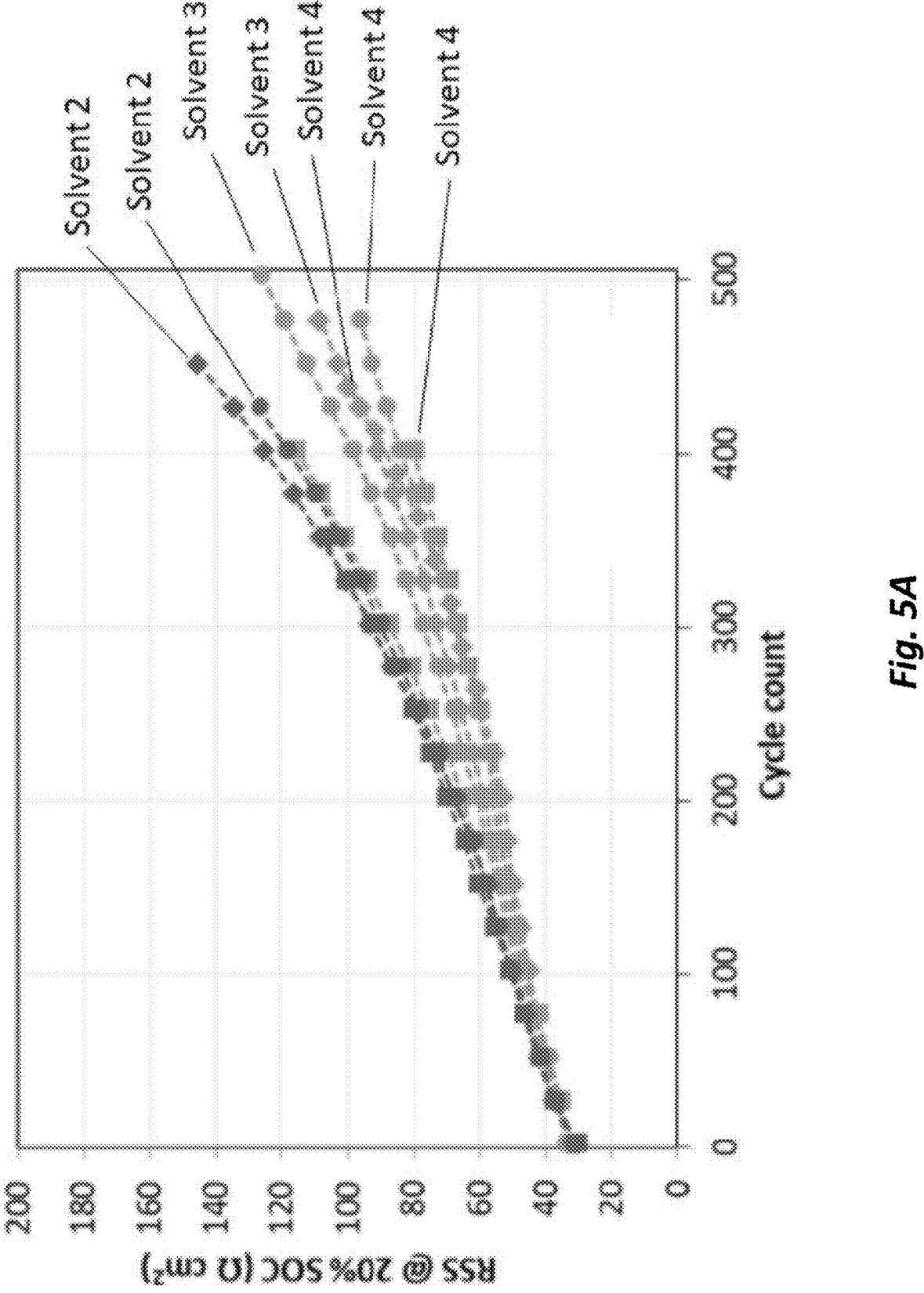
FIG. 5A presents a plot of the RSS of batteries containing electrolyte formulations for different combinations of additives, in accordance with illustrative embodiments.

FIG. 5A presents a plot of the RSS of batteries containing electrolyte formulations with three different combinations of additives. The electrolyte solutions with the highest RSS as a function of cycle count included only LiDFOB additive. The electrolyte solutions with the second highest RSS as a function of cycle count had the combination LiDFOB, PES, and MMDS. The electrolyte solutions with the lowest RSS as a function of cycle count had a combination of LiDFOB and PES additives.

FIG. 5B shows the composition of the control electrolyte fluid.

Example 4

Figure 6:
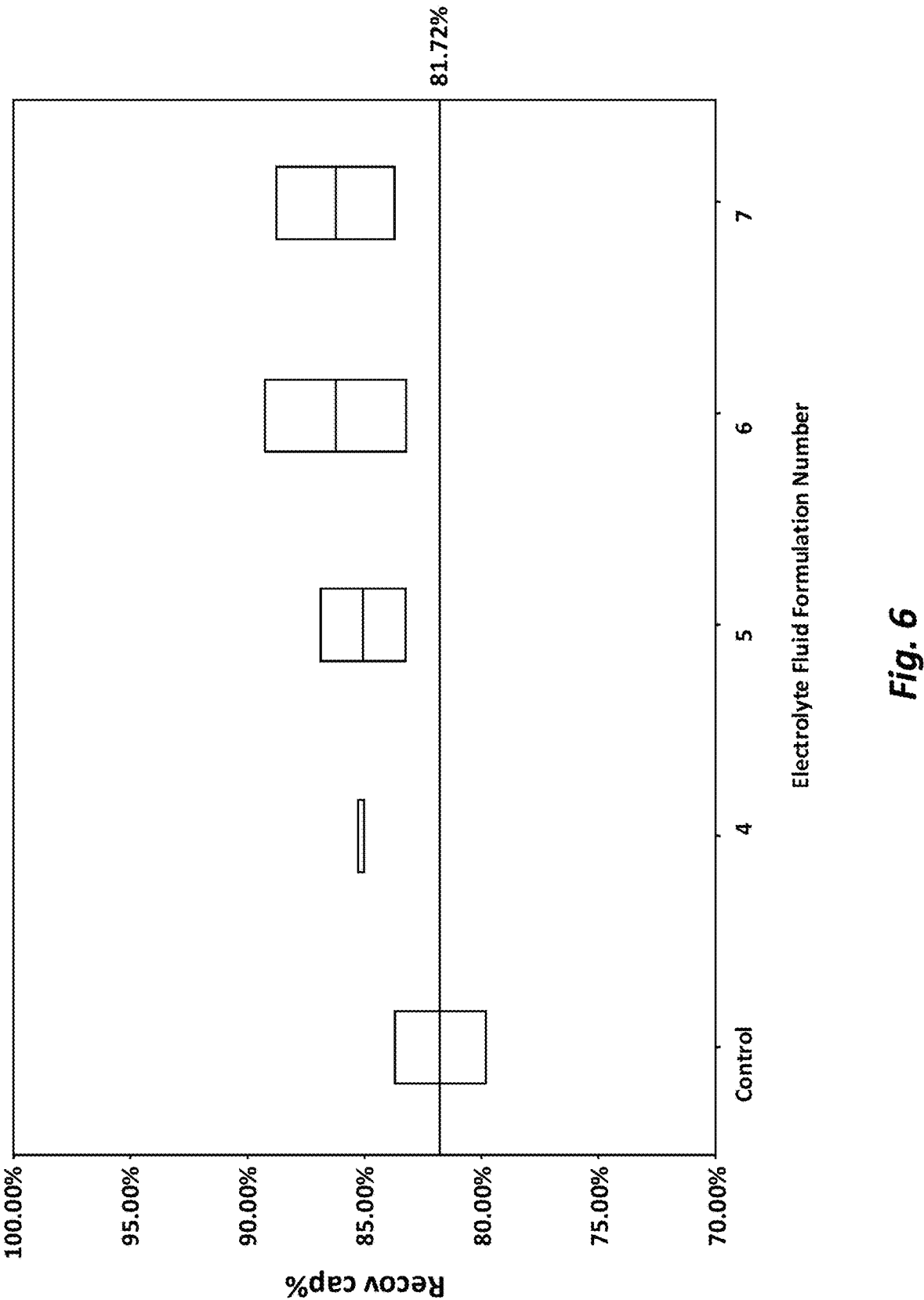
FIG. 6 presents recovery capacity of batteries with electrolyte fluids having different combinations of additives after 85° C. storage, in accordance with illustrative embodiments.

FIG. 6 depicts the recovery capacity after 85° C. storage for $LiCoO_2$/graphite cells with various electrolyte fluids

TABLE 1

| Electrolyte Fluid Form. | Salt/M | Solvent wt % | | | | Additives wt % | | | | | | | |
|---|---|---|---|---|---|---|---|---|---|---|---|---|---|
| Number | LiPF6 | EC | PC | PP | EP | LiDFOB | VEC | PES | PS | FEC | SN | HTCN | MMDS |
| 1 | 1.2 | 20 | 10 | 45 | 25 | 0 | 0 | 0 | 4 | 7 | 3 | 0 | 0 |
| 2 | 1.2 | 20 | 10 | 45 | 25 | 0.5 | 0.5 | 0 | 4 | 7 | 2 | 3 | 0 |
| 3 | 1.2 | 20 | 10 | 45 | 25 | 1 | 0 | 1 | 3 | 7 | 2 | 3 | 0.5 |
| 4 | 1.2 | 20 | 10 | 45 | 25 | 1 | 0 | 3 | 1 | 7 | 2 | 3 | 0 |
| 5 | 1.2 | 20 | 10 | 45 | 25 | 0.7 | 0 | 2.5 | 1.5 | 7 | 2 | 3 | 0.5 |
| 6 | 1.2 | 20 | 10 | 45 | 25 | 0.7 | 0 | 1.5 | 2.5 | 7 | 2 | 3 | 0.5 |
| 7 | 1.2 | 20 | 10 | 45 | 25 | 0.5 | 0 | 2 | 2 | 7 | 2 | 3 | 1 |

Table 1 shows a series of electrolyte compositions containing $LiPF_6$, along with solvents and additives in different combinations.

EXAMPLES

The Examples are provided for illustration purposes only. These examples are not intended to constrain any embodiment disclosed herein to any application or theory of operation.

Example 1

Figure 3A:
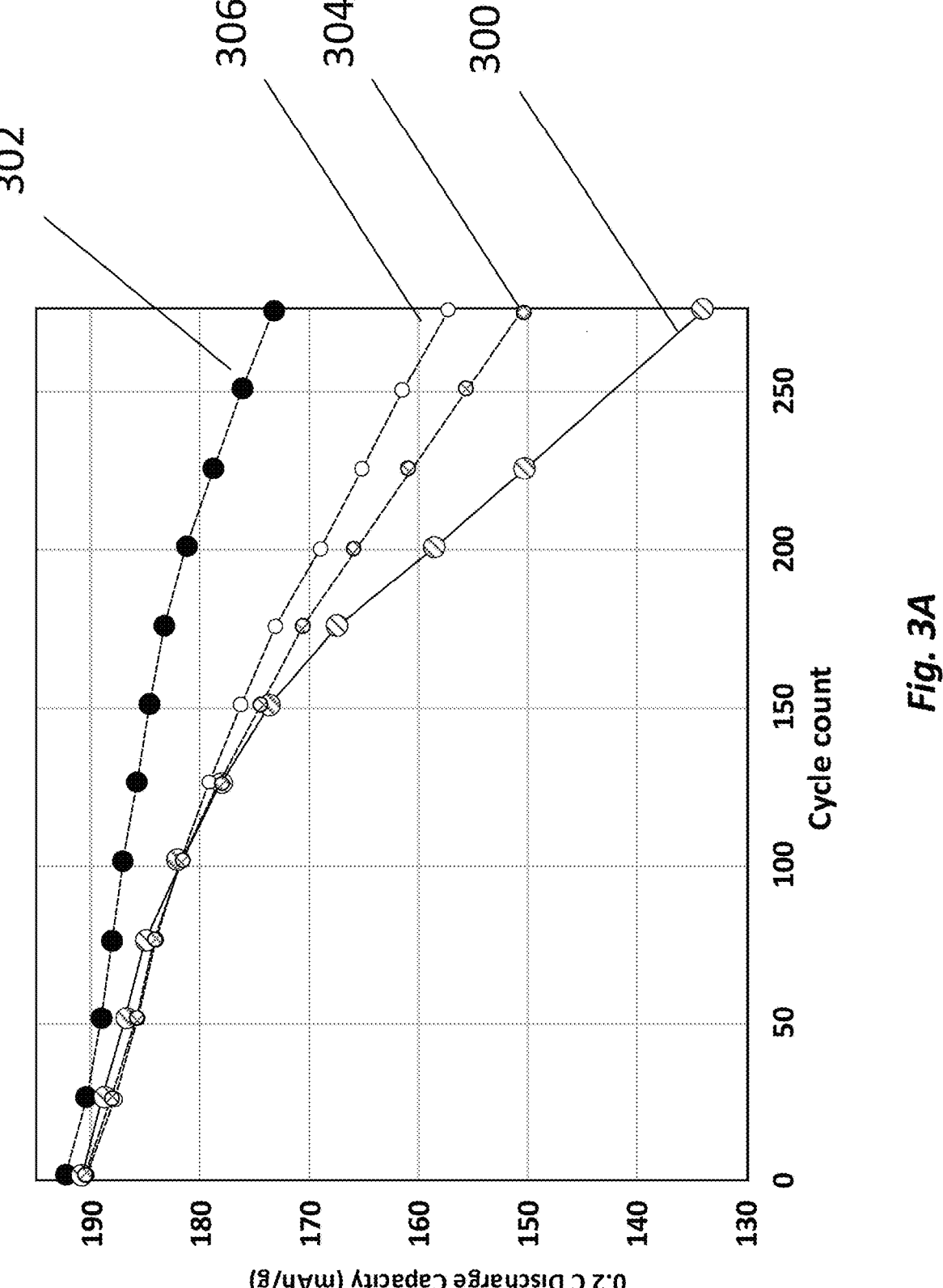
FIG. 3A presents a plot of discharge capacity as a function of cycle count for Li-ion batteries with separate electrolyte fluid additives LiDFOB, MMDS, and PES, in accordance with illustrative embodiments.

FIG. 3A presents a plot of the discharge capacities as a function of cycle count for Li-ion batteries having a $LiCoO_2$ with different additive combinations. The recovery capacity of each was measured. The formulated electrolytes containing a combination of LiDFOB, PES, and MMDS all had a higher recovery capacity after storage as compared to the absence of the additives.

The electrolyte fluids described herein can be valuable in battery cells, including those used in electronic devices and consumer electronic products. An electronic device herein can refer to any electronic device known in the art. For example, the electronic device can be a telephone, such as a cell phone, and a land-line phone, or any communication device, such as a smart phone, including, for example an iPhone®, an electronic email sending/receiving device. The electronic device can also be an entertainment device, including a portable DVD player, conventional DVD player, Blue-Ray disk player, video game console, music player, such as a portable music player (e.g., iPod®), etc. The electronic device can be a part of a display, such as a digital display, a TV monitor, an electronic-book reader, a portable web-browser (e.g., iPad®), watch (e.g., AppleWatch), or a computer monitor. The electronic device can also be a part of a device that provides control, such as controlling the streaming of images, videos, sounds (e.g., Apple TV®), or it can be a remote control for an electronic device. Moreover, the electronic device can be a part of a computer or its accessories, such as the hard drive tower housing or casing, laptop housing, laptop keyboard, laptop track pad, desktop keyboard, mouse, and speaker. The anode cells, lithium-metal batteries, and battery packs can also be applied to a device such as a watch or a clock.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A battery cell comprising:
a cathode comprising a cathode active material disposed on a cathode current collector;
an anode comprising an anode active material disposed on an anode current collector, the anode oriented towards the cathode such that the anode active material faces the cathode active material;
a separator disposed between the cathode active material and the anode active material; and
an electrolyte fluid comprising $LiPF_6$, 5 to 40 wt % ethylene carbonate (EC), 20 to 70 wt % propyl propionate (PP), 10 to 50 wt % ethyl propionate (EP), 2 to 20 wt % propylene carbonate (PC), 0.6-0.8 wt % lithium difluoro(oxalato)borate (LiDFOB), 1.3-1.6 wt % prop-1-ene-1, 3-sultone (PES), 2.0-3.0 wt % propane sultone (PS), 6.0-8.0 wt % FEC, 1.5-2.5 wt % succinonitrile (SN), 2.5-3.5 wt % HTCN, and 0.4-0.6 wt % methylene methanedisulfonate (MMDS).

2. The battery cell of claim 1, wherein the electrolyte fluid comprises 0.7 wt % LiDFOB, 1.5 wt % PES, 2.5 wt % PS, 7.0 wt % FEC, 2.0 wt % SN, 3.0 wt % HTCN, and 0.5 wt % MMDS.

3. The battery cell of claim 1, wherein the $LiPF_6$ has a concentration from 0.8 M to 1.6 M.

\* \* \* \* \*